Dec. 7, 1943. J. M. DODWELL 2,335,848
CLUTCH
Filed Oct. 7, 1941
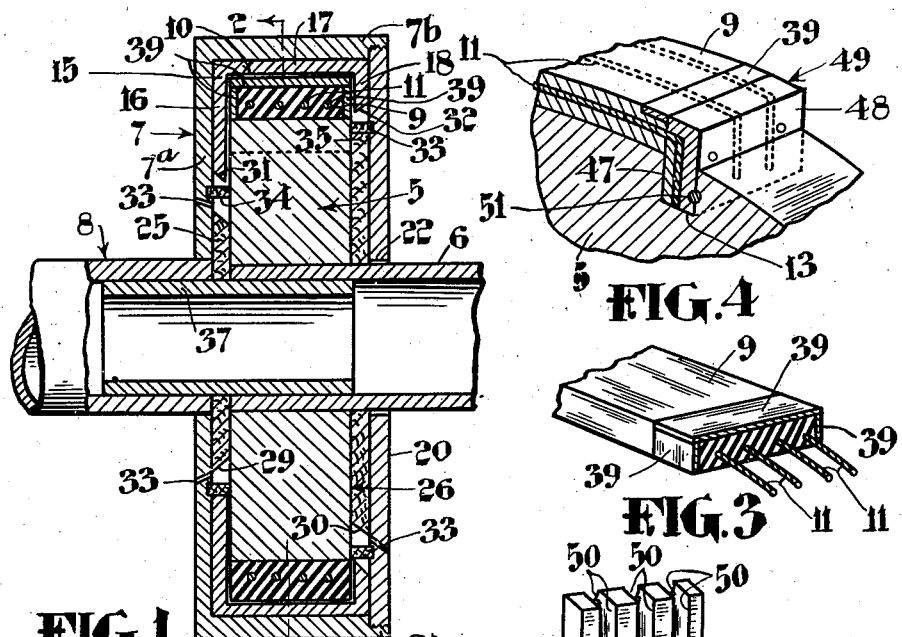
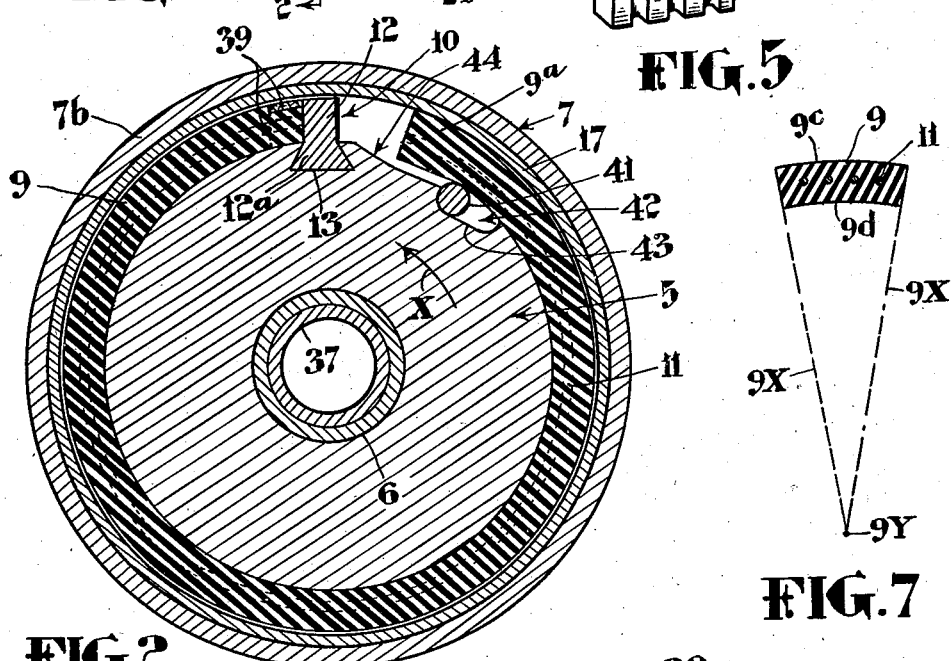
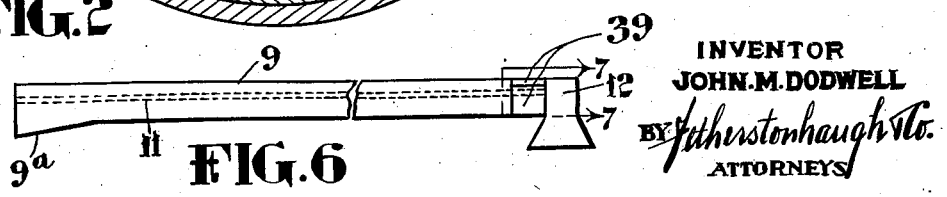
INVENTOR
JOHN M. DODWELL
BY Fetherstonhaugh & Co.
ATTORNEYS Patented Dec. 7, 1943

2,335,848

UNITED STATES PATENT OFFICE 2,335,848

CLUTCH

John M. Dodwell, Shawbridge, Quebec, Canada, assignor of one-half to Paul C. Jones, Montreal, Quebec, Canada Application October 7, 1941, Serial No. 414,024

13 Claims. (Cl. 192—41)

This invention relates to clutches of the type generally known as "free-wheeling" or "overrunning" clutches. Such clutches are used for coupling together the driving and driven shafts of an internal combustion engine starting mechanism and in various other relations. The improved clutch provided in accordance with this invention is adapted for use in all cases where an efficient "free-wheeling" clutch is required.

An important object of the invention is to provide an efficient free-wheeling clutch in which the metal-to-metal contact largely responsible for the noisy operation and excessive wear characteristic of the free-wheeling clutches now in use is completely eliminated.

Another object is the provision of a free-wheeling clutch in which the severity of the shock stresses imposed on the component parts of the clutch by the establishment of a driving connection between the driving and driven clutch members is substantially reduced as compared with the free-wheeling clutches now in use.

A further object is the provision of a free-wheeling clutch which is not only quieter in operation and less subject to wear and jamming as compared with the free-wheeling clutches now in use but is also considerably more economical as regards production, installation and maintenance costs.

A further object is the provision of a free-wheeling clutch including means for preventing damage due to over-loading. For example, in the case of a free-wheeling clutch which is used for coupling together the driving and driven shafts of the starting mechanism of an internal combustion engine it is desirable that over-load relieving means be incorporated in the design of the clutch to relieve the destructive over-loading force that would otherwise be imposed on the clutch and the starting mechanism in the case of back-fire. The present invention provides simple and effective means for relieving all parts of the starter mechanism, as well as all component parts of the free-wheeling clutch, of the destructive over-load to which such parts might otherwise be subjected in case of engine back-fire. The safety or over-load release feature here referred to is also of advantage in that it extends the normal life of all parts of the clutch and starter mechanism to a very considerable extent as compared with the use of free-wheeling clutches in which no provision is made for preventing destructive over-loading in case of engine back-fire or other causes of over-loading.

The foregoing and other objects, as well as the characteristic features of the invention will be more readily understood from the following detailed description taken in connection with the accompanying drawing—

Fig. 1 is a vertical sectional view of my improved clutch.

Fig. 2 is a sectional view taken along the line 2—2 of Fig. 1.

Fig. 3 is a fragmentary perspective view of the clutching element.

Fig. 4 is a detail view showing a modification of the anchoring means for securing the clutching element to the driven clutch member.

Fig. 5 is a detail view showing a component element of the anchorage means disclosed in Fig. 4.

Fig. 6 is a side elevation of the clutching element as it appears in its normally straight condition and Fig. 7 is a transverse sectional view taken along the line 7—7 of Fig. 6.

As shown in the drawing my improved clutch comprises a male clutch member 5 fixed to rotate with a driving shaft 6, a female clutch member 7 fixed to rotate with a driven shaft 8 and a non-metallic clutching element 9 arranged within an enclosed annular space 10 formed by and between the clutch members 5 and 7 when the latter are assembled in the interfitting relation shown in Figs. 1 and 2.

The male clutch member 5 is shown as a collar fixed to one end of the hollow driving shaft 6. This member carries the clutching element 9 which consists of a relatively long and narrow strip of flexible and freely elastic material such as rubber; said strip being expansible in cross section when subjected to longitudinal compression and having incorporated therein a series of reinforcing cords 11 which limit the longitudinal stretch of the strip. As shown in Figs. 6 and 7 the strip 9 is normally straight and is transversely curved in cross section, the upper surface of the strip being convexly curved as indicated at 9c and the lower surface being concavely curved as indicated at 9d. When in use the strip 9 is bent or curved to extend around the major portion of the periphery of the member 5 and has one end fastened to an anchoring key 12 provided with a dove-tail shaped portion 12a which is slidably and removably fitted in a groove 13 provided in member 5. When the strip 9 is thus bent or curved around the member 5 the transversely curved surfaces 9c and 9d are straightened or flattened out to give the flat rectangular cross sectional contour shown in Figs. 4 and 5. In this connection it may be explained that the strip 9 is bent or curved around the member 5 so that the surface 9d forms the inner periphery of the strip while the surface 9c forms the outer periphery of the strip. In this connection it may be explained that if the surfaces 9c and 9d of the strip were flat in the straight position of the strip illustrated in Fig. 6 the surface 9c would be caused to assume a concave transverse curvature and the surface 9d would be caused to assume a convex transverse curvature by the bending or curving of the strip around the member 5. In the driving condition of the clutch it is important that the entire width and sides of the strip 9 be in driving contact with the clutch members 5 and 7 and this, of course, means that the inner and outer peripheral surfaces and sides of the curved strip must be perfectly flat across their entire width. This is assured by forming the strip so that the surfaces 9c and 9d are transversely curved when the strip is in the straight condition shown in Fig. 6 but are flattened out when the strip is bent to the substantially circular form shown in Figs. 1 and 2. In this connection it will also be noted that when the strip 9 is in the normal straight or out-stretched position shown in Figs. 6 and 7 the sides of the strip are inclined so that, if imaginary converging lines 9x are drawn from these sides, they will meet at a point 9y which is located about 2¾" from the centre of the strip and which coincides with a centre of curvature common to both the curved surfaces 9c and 9d. During the bending of the strip 9 to the substantially circular form shown in Figs. 1 and 2 the sides of the strip become parallel to each other and parallel to the opposing side walls of the enclosed space 10.

The length and stretchability of the strip 9 is such that, when this strip is stretched to the maximum extent permitted by the stretch controlling cords 11, the free end of the strip, which is preferably thickened as indicated at 9a, will be spaced an appreciable distance from the strip anchoring key 12. When the clutch is at rest or is "free-wheeling" the strip 9 does not entirely fill the annular space 10 formed by and between the members 5 and 7 but the amount of clearance should be exceedingly small.

The driven member 7 is a drum-shaped member presenting an end wall 7a and a peripheral flange 7b. This member carries an annular channel shaped casing 15 which is a push-fit therein. As here shown casing 15 includes an inner side wall 16 which is a close fit against the end wall 7a of member 7, a peripheral wall 17 which is a tight or push-fit against the inner surface of the flange 7b of member 7 and an outer side wall 18 which is located inwardly with reference to the free edge of flange 7b. The width of the wall 16 of casing 15 is such that the inner diameter of this wall is less than the diameter of the clutch member 5. The width of the wall 18 of casing 15 is such that the inner diameter of this wall is very slightly greater than the diameter of the clutch member 5. This permits the clutch member 5 to be slipped inwardly through the opening bounded by the inner edge of the wall 18 when the clutch members 5 and 7 are being assembled in the interfitting relation shown in the drawing. It may be pointed out here that, prior to the assembly of the clutch members 5 and 7 in their interfitting relation, the clutching element or strip 9 with the key 12 and fibre inserts attached thereto is arranged in the inwardly facing channel afforded by the side and peripheral walls of the casing 15 so that the dove-tail shaped portion 12a of the key projects inwardly beyond the inner edge of the walls 18. The clutch member 5 is then fitted in the member 7 so that during this assembly the dove-tail portion 12a of the key 12 is received in the groove 13. The clutch member 5 is then secured in place by a ring-shaped facing plate 20, which is screwed into the outer portion of the flange 7b as indicated at 21, said facing plate being provided with a central opening 22 for the passage of the driving shaft 6, said opening being larger than the shaft to provide clearance.

A thrust washer 25 is interposed between the end wall 7a of member 7 and the adjacent side of the clutch member 5 and a similar thrust washer 26 is interposed between the opposite side of the clutch member 5 and the face plate 20. The washers 25 and 26 are slightly thicker than the walls 16 and 18 of casing 15 and provided with beveled edges 29 and 30 which serve, in conjunction with the bevelled edges 31 and 32 of said walls 16 and 18 to guide or deflect lubricating oil outwardly through the oil exhaust openings 33 to prevent such oil being thrown to the periphery of the clutch member 5 and into contact with the clutching element or strip 9. If desired, an oil retaining ring 34 of any suitable material may be arranged between the bevelled edge 29 of the thrust washer 25 and the opposing bevelled edge 31 of wall 16 and a similar ring 35 may be arranged between the bevelled edge 30 of the thrust washer 26 and the bevelled edge 32 of wall 18.

The driven shaft 8 carries a bushing 37 which extends into and is a rotatable fit in the hollow driving shaft 6. This bushing serves as a central aligning bearing which holds the shafts 8 and 6 in alignment and serves to prevent wobbling of the male clutch member 5 with reference to the female clutch member 7. In this connection it is important that the clutch members 5 and 7 be held in correct alignment to maintain the desired clearance between the clutching element 5 and the female clutch member 7. When the clutch is at rest or is free-wheeling correct alignment of the clutch members is also necessary to ensure efficient operation of the clutch.

As will be evident from the foregoing description the side and outer peripheral walls of the space 10 in which clutch strip 9 is housed are formed respectively by the side walls 16 and 18 and the peripheral wall 18 of casing 15, the inner peripheral wall of said space being formed by the periphery of the driving member 5 with which the strip 9 is normally in contact except at its free end. When strip 9 is in relaxed or normal condition it is clear of contact with the side and outer peripheral walls of the enclosed space 10 except at the extreme free end of the strip where contact is made with the outer peripheral wall of the casing 15 as shown to advantage in Fig. 2. If we assume that shafts 6 and 8 are rotating in the same direction as indicated by the arrow X and that shaft 8 is turning faster than shaft 6 there will be a drag exerted on the free end of the clutching strip 9 which, in addition to a slight tendency to stretch the strip, will tend to wind it more closely around the driving member 5 with the result that said strip offers practically no resistance to the turning of the clutch member 7 relative to the clutching member 5. This is the free-wheeling condition. On the other hand if the driving clutch member 5 is turned in the direction of the arrow X while the member 7 is at rest the strip 9 will be subjected to lengthwise compression between the anchoring key 12 and its point or points of contact with the outer peripheral wall of the casing 15 which, except under overload conditions, turns as a unit with the driven clutch member 5. This longitudinal compression of the strip 9 causes it to be shortened and, at the same time, to be expanded laterally to completely fill the cross sectional area of the enclosing space 10. In other words, as the strip 9 is compressed the material thereof flows radially and laterally to fill the space 10 and thus establish a positive driving connection between the driving clutch member 5 and the driven clutch member 7. If, subsequent to the establishment of this driving connection the torque load on the clutch increases beyond a predetermined value, the casing 15 will turn as a unit with the member 5 and the strip 9 relative to the driven clutch member 7 to prevent damage due to such overload. Another advantage of the construction described herein is that the resilient compressibility of the clutch strip 9 gives sufficient cushioning action during the establishment of the driving connection between the clutch members 5 and 7 to reduce the severity of the shock stresses which are ordinarily imposed on the component parts of a free-wheeling clutch when the driving and driven members are clutched together.

We will assume now that the members 5 and 7 have been clutched together by the aforesaid lengthwise compression and lateral expansion of the clutch member 9 and that the driven clutch member 7 is now commencing to overrun the driving clutch member 5. As soon as this condition obtains the strip 9 is relieved of lengthwise compression and, due to its inherent resiliency, immediately springs back to its normal full length relaxed or contracted condition so that the driving connection previously established between the clutch members is thus immediately relieved and without any tendency to sticking as soon as the driven clutch member commences to overrun the driving clutch member. As a matter of fact this immediate elastic return of the clutch strip 9 to its clutch disengaging condition is assisted by the dragging and stretching action which the clutch member 7 exerts against the strip 9 under free-wheeling conditions.

It is desirable, during the longitudinal compression and lateral expansion of the strip 9, to prevent flow or displacement of the material of the strip into the clearance spaces reserved between the strip anchoring key 12 and the walls 16, 17 and 18 of casing 15. In practice it has been found that if the material of the strip 9 is permitted to be displaced into these clearance spaces there is apt to be some shearing of the displaced material between the edges of the key 12 and the said walls of the casing 15. In order to prevent this fibre inserts 39 are inlaid in the side and outer peripheral surfaces of the strip 9 immediately adjacent the key 12. The side inserts 39 which are inlaid in the sides of the strip 9 are left free of attachment to the peripheral insert 39 which is laid in the peripheral surface of the strip so that these inserts, while preventing crowding of the material of the strip into the aforesaid clearance spaces, do not interfere with the lateral expansion of the anchored end of the strip during the establishment of a drive connection between the clutch members 5 and 7. When the strip 9 is subjected to longitudinal compression between the clutch members 5 and 7 the lateral expansion at the anchored end of the strip causes the inserts 39 to move outwardly against the opposing walls of the space 10. While I have stated that the inserts 39 are preferably made of fibre, they may be made of any other suitable material.

In Fig. 2 I have shown a pinch roller 41 interposed between the clutch member 5 and the strip 9 at a point adjacent the free end of the strip. The roller 41 works in a peripheral recess 42 the bottom wall 43 of which is inclined so that the roller 41 approaches the peripheral wall 17 of casing 15 when said roller is displaced in a clockwise direction relative to the member 5 when the latter is rotated in a counter-clockwise direction as viewed in Fig. 2. The free end 9a of strip 9 is somewhat thicker as compared with the remainder of the strip so as to cooperate more effectively with the roller 41.

Assuming that the clutch member 7 is at rest and that the clutch member 5 is turned in the direction indicated by the arrow X the said member 5 will have a slight initial relative movement with respect to both the roller 41 and the free end 9a of the strip since the said free end of the strip is held back by its contact with the wall 17 of casing 15. This relative movement between the member 5 and the roller 41 causes the latter to be forced outwardly against the adjacent portion of the strip 9 and to press the latter tightly against the wall 17. This ensures that the whole length of the strip 9 lying between the key 12 and the roller 41 will be uniformly expanded into tight frictional engagement with the defining walls of the enclosed space 10. The action of the parts is also such that the roller 41 tends to become wedged between the inclined bottom wall 43 of the recess 42 and the thickened end 9a of the strip 9, but unwedges readily and automatically rolls back to original position when rubber strip 9 expands in overrunning condition.

A portion of the periphery of the member 5 is cut away between the key 12 and the recess 42 to ensure a certain amount of clearance between this portion of the member 5 and the end portion of the strip 9 which projects beyond the roller 41. If desired the roller 41 may be replaced by some form of rocker member or other device which will give the same results.

The casing 15, while constituting an important safe-guard against damage to the component parts of the clutch in case of jamming or overloading, is not an absolutely essential feature of the invention and may be dispensed with if desired. In this connection it will be understood that, when the casing 15 is omitted, the side and outer peripheral walls of the annular space 10 will be constituted by the end wall 7a and flange 7b of member 7 and by the inner side of the face plate 20. In this latter event the dimensions of the clutch will, of course, be changed so that the required small clearance will be provided between the strip 9 and the wall members forming the side and outer peripheral portions of the space 10.

It is important that the fibre inserts 39 be securely fastened to the strip 9 and that the latter be securely anchored to the key 12 to avoid separation of these parts in service. This, however, may be accomplished in any one of several ways. In Figs. 1 and 2 strip 9 is shown cemented to the key 12. This may be accomplished by cementing and/or vulcanizing the strip 9 to the key 12 during the process of manufacture of the strip or by any other method of cementing which will prevent these parts becoming detached in service.

In Figs. 4 and 5 I have shown a modification in which the stretch controlling cords 11 of the strip 9 are extended beyond the key engaging end of the strip and are clamped in place between the parts 47 and 48 of a two-part key generally indicated at 49, the part 47 of said key being provided with suitable cord receiving grooves 50. This form of key is preferably provided with straight sides and is removably secured in the groove 13 of member 5 by a suitable fastening screw 51. Various other methods of anchoring the strip 9 to the member 5 may also be resorted to.

The fibre inserts 39 are preferably vulcanized to the strip 9 during molding or forming of the latter but may be secured in place in any other suitable manner.

It may also be pointed out that it is not absolutely essential to this invention that the strip 9 be anchored to the member 5. On the contrary, the strip 9 may be arranged with one end anchored to the peripheral portion of the member 7 and the inner or free end disposed to engage the peripheral portion of the member 5. In this case the roller 41, if used, will be interposed between the peripheral portion of the member 7 and the strip 9 adjacent the free end of the latter. So far as the actual operation is concerned, it is immaterial for many purposes whether the female member 7 or male member 5 constitute the driving member of the clutch.

In addition to the specific modifications mentioned herein it is contemplated that various other changes in the construction and arrangement of the parts may be resorted to within the scope or spirit of the invention as defined by the appended claims.

Having thus described my invention, what I claim is:

1. A "free-wheeling" clutch comprising rotary driving and driven clutch members rotatable about a common axis and fitted together to provide an enclosed annular space encircling said axis, a clutching element arranged within said enclosed space and comprising a strip of material which is flexible, freely elastic and expansible in cross section, one end of said strip being anchored to the driving clutch member and the other end being free and disposed in contact with the driven clutch member, the cross sectional area of said strip being slightly less than the cross sectional area of said enclosed space when the clutch is at rest or is free-wheeling but being increased, by longitudinal compression of the strip between said clutch members to fill said enclosed space, when the driving clutch member to which the strip is attached is rotated relatively to the driven clutch member and in the direction of the free end of the strip.

2. A "free-wheeling" clutch as set forth in claim 1 including means interposed between the driving clutch member and said strip for forcing said strip outwardly against the driven clutch member in response to movement of the driving clutch member relative to said strip and in the direction of the free end of the strip.

3. A clutch as set forth in claim 1 in which the driven clutch member comprises two parts, only one of which is engaged by the clutching element, said parts being fitted together so that they normally rotate as a unit but are free to rotate relatively to each other under predetermined conditions of overload.

4. A clutch as set forth in claim 1 in which said strip is provided with lengthwise extending stretch controlling cords which limit the maximum stretch of the strip by the drag exerted thereon when the clutch is free wheeling.

5. A clutch as set forth in claim 1, in which the clutching element is anchored to a key which is slidably and removably fitted in a peripheral recess provided in the driving clutch member.

6. A clutch as set forth in claim 1, in which a two-part key is fitted in a peripheral recess provided in the driving clutch member and in which the clutching element is provided with a plurality of stretch controlling cords which extend the full length of said element and project beyond the anchored end thereof, the projecting ends of said cords being clamped in place between the two parts of said key.

7. A clutch as set forth in claim 1, in which a key is carried by the driving clutch member and projects beyond the periphery of said clutch member and in which the anchored end of said clutching element is secured to said key, said clutching element being provided with hard inserts inlaid in the side and outer peripheral portions thereof immediately adjacent said key, said inserts serving to prevent crowding of the elastic material of the clutching element into clearance spaces reserved between the key and the side and outer peripheral walls of said enclosed space.

8. A clutch as set forth in claim 1, in which the free end of the clutching element is enlarged and in which means are interposed between the driving clutch member and the clutching element adjacent the enlarged end thereof, said means cooperating with said enlarged end to force the clutching element outwardly against the driving clutch member in response to movement of the driving clutch member relative to the clutching element in the direction of the free end of the latter.

9. A clutch as set forth in claim 1, in which thrust washers are interposed between opposing side portions of the driving and driven clutch members and serve to hold the clutching element in spaced relation to the side walls of said enclosed space when the clutch is at rest or is free-wheeling, said thrust washers being provided with bevelled edges opposed to corresponding inclined bevelled edges presented by portions of the driven clutch member, said bevelled edges being located intermediate the inner and outer periphery of the driving clutch member and serving as oil deflecting guides to prevent oil being thrown from the inner to the outer periphery of the driving clutch member and into contact with the clutching element.

10. A clutch as set forth in claim 1, in which thrust washers are interposed between opposing side portions of the driving and driven clutch members and serve to hold the clutching element in spaced relation to the side walls of said enclosed space when the clutch is at rest or is free-wheeling, said thrust washers being provided with bevelled edges opposed to corresponding inclined bevelled edges presented by portions of the driven clutch member, said beveled edges being located intermediate the inner and outer periphery of the driving clutch member and serving as oil deflecting guides to prevent oil being thrown from the inner to the outer periphery of the driving clutch member and into contact with the clutching element, said driving clutch member being provided with oil exhaust holes opening into the interior of the clutch assembly at points located between the bevelled edges of the thrust washers and the opposing bevelled edges of the driving clutch member.

11. A clutch as set forth in claim 1 including oil collecting rings arranged between opposing side surfaces of the driving and driven clutch members and encircling the axis of rotation of said members, said rings being of a diameter greater than the inner diameter of the driving clutch member but less than the outer diameter of said clutch member.

12. A clutch as set forth in claim 1 in which the driven clutch member comprises an outer casing including an end wall and a peripheral flange and an inner casing including a peripheral wall and side flanges, the peripheral wall of the inner casing being a push-fit in the peripheral flange of the outer casing, at least one of the side flanges of said inner casing being dimensioned so that its inwardly facing edge describes a circle whose diameter is slightly greater than the outer diameter of the driving clutch member.

13. A free-wheeling clutch as set forth in claim 1 including a central aligning bearing by means of which the relatively rotatable parts of the clutch assembly are maintained in correct alignment at all times.

JOHN M. DODWELL.